(12) United States Patent
Kim et al.

(10) Patent No.: US 11,014,817 B2
(45) Date of Patent: May 25, 2021

(54) GRAPHENE METAL NANOPARTICLE-COMPOSITE

(71) Applicant: GACHON UNIVERSITY OF INDUSTRY-ACADEMIC COOPERATION FOUNDATION, Seongnam-si (KR)

(72) Inventors: Tae Young Kim, Seoul (KR); Jong Pal Hong, Seongnam-si (KR)

(73) Assignee: GACHON UNIVERSITY OF INDUSTRY-ACADEMIC COOPERATION FOUNDATION, Seongnam-si (KR)

( * ) Notice: Subject to any disclaimer, the term of this patent is extended or adjusted under 35 U.S.C. 154(b) by 269 days.

(21) Appl. No.: 15/609,111

(22) Filed: May 31, 2017

(65) Prior Publication Data
US 2017/0341939 A1   Nov. 30, 2017

(30) Foreign Application Priority Data

May 31, 2016   (KR) .......................... 10-2016-0067555

(51) Int. Cl.
   *B82Y 30/00*   (2011.01)
   *B82Y 40/00*   (2011.01)
   (Continued)

(52) U.S. Cl.
   CPC ............ *C01B 32/194* (2017.08); *C01B 32/19* (2017.08); *B82Y 30/00* (2013.01); *B82Y 40/00* (2013.01);
   (Continued)

(58) Field of Classification Search
   CPC ......... B82Y 30/00; B82Y 40/00; C01B 32/19; C01B 32/194; Y10S 977/734;
   (Continued)

(56) References Cited

U.S. PATENT DOCUMENTS

2004/0258608 A1*  12/2004  Cayton ............... B01F 17/0028
                                                        423/592.1
2009/0297830 A1*  12/2009  Pyles .................... B82Y 30/00
                                                          428/327

(Continued)

FOREIGN PATENT DOCUMENTS

CN           101607317 A      12/2009
KR    10-2011-0087456 A       8/2011

OTHER PUBLICATIONS

Qiqi Zhuo et al. "Facile Synthesis of Graphene/Metal Nanoparticle Composites via Self-Catalysis Reduction at Room Temperature". Inorganic Chemistry, Mar. 1, 2013, vol. 52, pp. 3141-3147. (Year: 2013).*

(Continued)

*Primary Examiner* — Alexander M Weddle
(74) *Attorney, Agent, or Firm* — Hamre, Schumann, Mueller & Larson, P.C.

(57) ABSTRACT

The present disclosure relates to a method of preparing a graphene metal nanoparticle-composite, including: preparing graphene by applying a shearing force to a first solution containing a graphite-based material and thus exfoliating the graphite-based material; preparing metal nanoparticles by applying a shearing force to a second solution containing a metal precursor, a capping agent, and a reducing agent; and physically combining the metal nanoparticles on the graphene by applying a shearing force to a third solution containing the graphene and the metal nanoparticles, and a graphene metal nanoparticle-composite prepared according to the method.

6 Claims, 7 Drawing Sheets

(51) Int. Cl.
*C01B 32/19* (2017.01)
*C01B 32/194* (2017.01)

(52) U.S. Cl.
CPC ....... *C01P 2004/04* (2013.01); *Y10S 977/734* (2013.01); *Y10S 977/773* (2013.01); *Y10S 977/81* (2013.01); *Y10S 977/847* (2013.01); *Y10S 977/896* (2013.01)

(58) Field of Classification Search
CPC .............. Y10S 977/773; Y10S 977/81; Y10S 977/847; Y10S 977/896
USPC .......................................................... 427/212
See application file for complete search history.

(56) References Cited

U.S. PATENT DOCUMENTS

2011/0186789 A1* 8/2011 Samulski .............. B82Y 30/00
  252/514

2012/0261612 A1* 10/2012 Suh ......................... C08K 3/04
  252/182.3

OTHER PUBLICATIONS

Tran et al. "High shear-induced exfoliation of graphite into high quality graphene by Taylor-Couette flow". RSC Advances, Jun. 2016. (Year: 2016).*

Park et al., "Facile synthesis of graphene oxide in a Couette-Taylor flow reactor". CARBON 83 (2015), pp. 217-223. (Year: 2015).*

Qiqi Zhuo et al., "Facile Synthesis of Graphene/Metal Nanoparticle Composites via Self-Catalysis Reduction at Room Temperature," Inorganic Chemistry, Mar. 1, 2013, vol. 52, pp. 3141-3147.

Tran et al.; "High shear-induced exfoliation of graphite into high quality graphene by Taylor-Couette flow", from the journal RSC Advances, Jun. 2016.

Park et al.; "Facile synthesis of graphene oxide in a Couette-Taylor flow reactor", Elsevier, ScienceDirect; vol. 83, Mar. 2015, pp. 217-223.

* cited by examiner

GRAPHENE METAL NANOPARTICLE-COMPOSITE

CROSS-REFERENCE TO RELATED APPLICATION

This application claims the benefit under 35 USC 119(a) of Korean Patent Application No. 10-2016-0067555 filed on May 31, 2016, in the Korean intellectual Property Office, the entire disclosures of which are incorporated herein by reference for all purposes.

TECHNICAL FIELD

The present disclosure relates to a method of preparing a graphene metal nanoparticle-composite and a graphene metal nanoparticle-composite prepared using the method.

BACKGROUND

Graphene is a two-dimensional nanostructure of covalently bonded carbon atoms and exhibits excellent mechanical, electrical, and thermal properties. A graphene flake includes single or several layers exfoliated from graphite, and has been reconstituted into a bulk structure having a high strength and a modulus exceeding that of flexible graphite.

The graphene can be applied in various forms. For example, the graphene may be combined with various materials such as metal or the like to prepare a graphene hybrid material and thus may be used as a material for sensors and electrodes. Korean Patent Laid-open Publication No. 10-2010-0006880 discloses a method of preparing a polymer-carbon nanostructure composite, including: mixing carbon nanostructures formed of carbon nanotube (CNT), graphene, or a mixture of CNT and graphene with a liquid medium to prepare a masterbatch suspension in which the carbon nanostructures are dispersed; melting a polymer material; and mixing the melted polymer material with the masterbatch suspension to prepare a polymer-carbon nanostructure composite, wherein the liquid medium is a polymeric processing additive including one or more selected from a plasticizer, a heat stabilizer, a UV stabilizer, a flame retardant, a foaming agent, and an impact modifier.

Recently, various attempts to uniformly distribute a material such as metal on graphene in a short time have been made.

SUMMARY

In view of the foregoing, the present disclosure provides a method of preparing a graphene metal nanoparticle-composite, including: preparing graphene by applying a shearing force to a first solution containing a graphite-based material and thus exfoliating the graphite-based material; preparing metal nanoparticles by applying a shearing force to a second solution containing a metal precursor, a capping agent, and a reducing agent; and physically combining the metal nanoparticles on the graphene by applying a shearing force to a third solution containing the graphene and the metal nanoparticles, and a graphene metal nanoparticle-composite prepared using the method in order to uniformly distribute metal nanoparticles on graphene in a short time and physically combine the graphene nanoparticles with graphene at the same time.

However, problems to be solved by the present disclosure are not limited to the above described problems. Although not described herein, other problems to be solved by the present disclosure can be clearly understood by those skilled in the art from the following description.

In a first aspect of the present disclosure, there is provided a method of preparing a graphene metal nanoparticle-composite includes: preparing graphene by applying a shearing force to a first solution containing a graphite-based material and thus exfoliating the graphite-based material; preparing metal nanoparticles by applying a shearing force to a second solution containing a metal precursor, a capping agent, and a reducing agent; and physically combining the metal nanoparticles on the graphene by applying a shearing force to a third solution containing the graphene and the metal nanoparticles.

In a second aspect of the present disclosure, there is provided a graphene metal nanoparticle-composite prepared by the method according to the first aspect of the present disclosure.

According to the present disclosure, it is possible to provide a method of preparing a metal nanoparticle-composite, capable of uniformly distributing metal nanoparticles on graphene and combining them in a relatively short time as compared with a conventional technology.

Further, according to the present disclosure, it is possible to simplify a process of preparing graphene metal nanoparticles by performing a reaction in a relatively mild condition (room temperature) as compared with the conventional technology.

Furthermore, according to the present disclosure, it is possible to provide a high-quality metal nanoparticle-composite by using high-quality graphene, which does not go through oxidation-reduction reactions, as a reactant for preparing the graphene.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
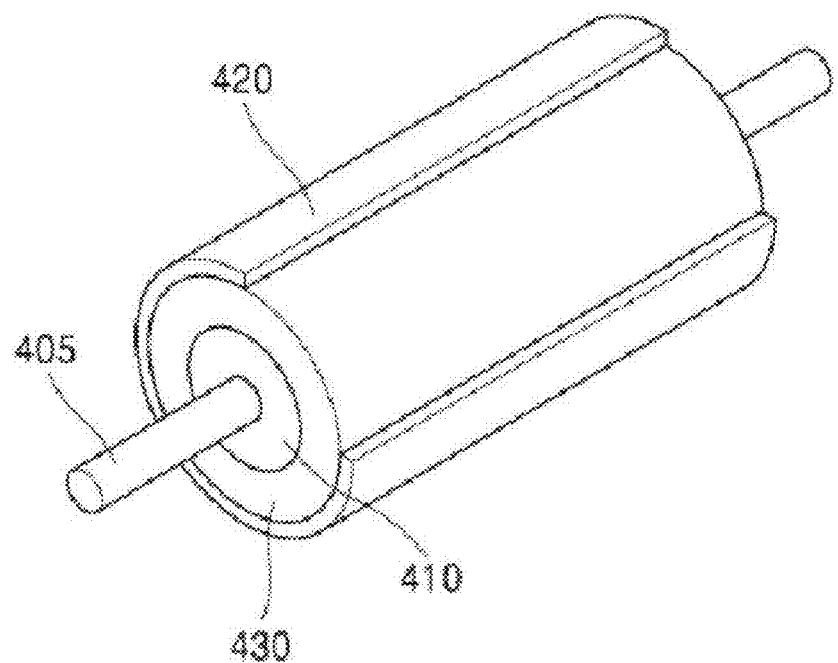
FIG. 1 is a perspective view schematically illustrating an example of a reactor which can be applied to a method of preparing a graphene metal nanoparticle-composite in accordance with the present disclosure.

Hereinafter, example embodiments of the present disclosure will be described in detail with reference to the accompanying drawings so that the present disclosure may be readily implemented by those skilled in the art. The present disclosure is not limited to the example embodiments but can be embodied in various other ways. In the drawings, parts irrelevant to the description are omitted for the simplicity of explanation, and like reference numerals denote like parts throughout the whole document.

Throughout the whole document of the present disclosure, the term "connected to" or "coupled to" that is used to designate a connection or coupling of one element to another element includes both a case that an element is "directly connected or coupled to" another element and a case that an element is "electronically connected or coupled to" another element via still another element.

Throughout the whole document of the present disclosure, the term "on" that is used to designate a position of one element with respect to another element includes both a case that the one element is adjacent to the another element and a case that any other element exists between these two elements.

Throughout the whole document of the present disclosure t, the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document of the present disclosure, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Throughout the whole document of the present disclosure, the term "step of" does not mean "step for".

Throughout the whole document of the present disclosure, the term "combination of" included in Markush type description means mixture or combinations of one or more components, steps, operations and/or elements selected from a group consisting of components, steps, operation and/or elements described in Markush type and thereby means that the disclosure includes one or more components, steps, operations and/or elements selected from the Markush group.

Throughout the whole document of the present disclosure, the description "A and/or B" means "A or B, or A and B".

Hereinafter, embodiments and Examples of the present disclosure will be described in detail with reference to the accompanying drawings. However, the present disclosure may not be limited to the following embodiments, Examples, and drawings.

The present disclosure relates to a method of preparing a graphene metal nanoparticle-composite and a graphene metal nanoparticle-composite prepared using the method.

In an example embodiment of the present disclosure, there is provided a method of preparing a graphene metal nanoparticle-composite, including: preparing graphene by applying a shearing force to a first solution containing a graphite-based material and thus exfoliating the graphite-based material; preparing metal nanoparticles by applying a shearing force to a second solution containing a metal precursor, a capping agent, and a reducing agent; and physically combining the metal nanoparticles on the graphene by applying a shearing force to a third solution containing the graphene and the metal nanoparticles.

In an example embodiment of the present disclosure, the graphite-based material may be non-intumescent graphite or compressed intumescent graphite.

In an example embodiment of the present disclosure, the metal precursor may be selected from hydroxide, nitrate, sulfate, acetate, phosphate, silicate, hydrochloride, and combinations thereof of a metal, which is selected from silver, gold, copper, nickel, cobalt, molybdenum, palladium, platinum, tin, zinc, titanium, chromium, tantalum, tungsten, iron, rhodium, iridium, ruthenium, osmium, aluminum, lead, and combinations thereof. In an example embodiment of the present disclosure, the metal precursor may be selected from $Cu(NO_3)_2$, $CuCl_2$, $CuSO_4$, $Cu(OH)_2$, $Cu(CH_3COO)_2$, and combinations thereof.

In an example embodiment of the present disclosure, the capping agent may be selected from polyvinylpyrrolidone (PVP), polyvinyl alcohol (PVA), polyaniline, polypyrrole, cetyltrimethyl ammonium bromide (CTAB), and combinations thereof, but is not limited thereto.

In an example embodiment of the present disclosure, the reducing agent may be selected from $NaBH_4$, $LiBH_4$, $KBH_4$, hydrazine, NaOH, and combinations thereof, but is not limited thereto.

In an example embodiment of the present disclosure, the metal nanoparticles may include one or more metals in the form of element or alloy. Desirably, the metal may be selected from silver, gold, copper, nickel, cobalt, molybdenum, palladium, platinum, tin, zinc, titanium, chromium, tantalum, tungsten, iron, rhodium, iridium, ruthenium, osmium, aluminum, lead, and combinations thereof. The nanoparticles refer to particles with an average diameter of 100 nm or less, and may have a size of desirably 60 nm or less and more desirably from 10 nm to 25 nm.

In an example embodiment of the present disclosure, a solvent of the first solution may be selected from pyrrolidone-based compounds such as NMP (N-methyl-2-pyrolidone), amide-based compounds such as DMF (N,N-dimethylformamide), and combinations thereof, but is not limited thereto. A solvent of the second solution may be selected from ethylene glycol, propylene glycol, diethylene glycol, triethylene glycol, glycerine, and combinations thereof, but is not limited thereto. A solvent of the third solution may be selected from combinations of the solvent of the first solution and the solvent of the second solution, but is not limited thereto.

In an example embodiment of the present disclosure, the shearing force may be generated by rotating a fluid including each solution and using a rotating flow of the rotated fluid. The fluid may be stored in a reaction space of a reactor, and the reactor may include an inner body extended in a horizontal direction and a cylindrical outer body which surrounds the inner body as being spaced from the inner body and forms the reaction space therein, and the rotating flow of the fluid may be generated via rotation of the inner body.

Figure 2:
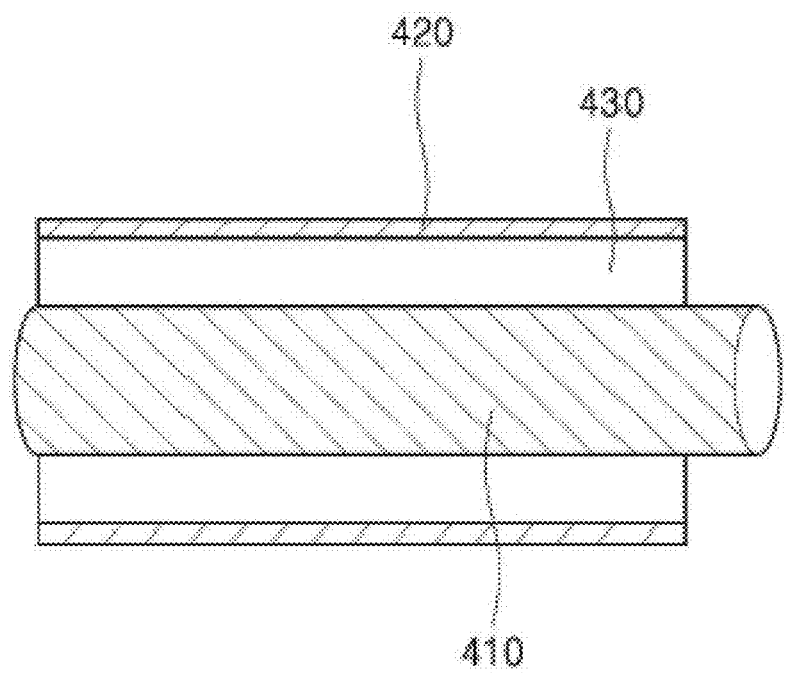
FIG. 2 is a cross-sectional view schematically illustrating an example of the reactor which can be applied to a method of preparing a graphene metal nanoparticle-composite in accordance with the present disclosure.

Referring to FIG. 1 and FIG. 2, the reactor uses a flow of a Taylor fluid, and includes an inner body 410 extended in a horizontal direction and a cylindrical outer body 420 surrounding the inner body 410 as being spaced from the inner body 410. A reaction space 430 is formed between the inner body 410 and the cylindrical outer body 420. Further, an encapsulant is formed at both ends of the inner body 410 and the cylindrical outer body 420. Furthermore, the inner body 410 is rotated around a horizontal axis by a rotation shaft 405, and the cylindrical outer body 420 is immobilized.

In an example embodiment of the present disclosure, the reactor may have a length of from about 10 cm to about 1 m, and the reaction space may have a volume of from about 10 mL to about 10 L, but is not limited thereto.

In an example embodiment of the present disclosure, the fluid may further contain a dispersing agent in order to improve the efficiency of exfoliating the graphite-based material, preparing the metal nanoparticles, and preparing the graphene metal nanoparticle-composite. The dispersing agent may be selected from NaC (Sodium Cholate) PVA (poly vinyl alcohol), PVP (poly vinyl pyrrolidone), PSS (polystyrenesulfonate), DBSA (dodecylbenzenesulfonic acid) ionic liquid, and combinations thereof, but is not limited thereto.

In an example embodiment of the present disclosure, as a means of improving the fluidity of the fluid, the inner body 410 may be rotated at a rotation speed of 1,000 rpm or more, and more desirably from 1,000 rpm to 5,000 rpm. As the rotation speed of the inner body 410 is increased, the rotating flow of the fluid is increased, and, thus, a shearing force applied to the fluid can also be increased. If the rotation speed is less than 1000 rpm, there is a limitation in forming a Taylor fluid bed and the shearing efficiency of the fluid bed may be decreased.

In the present disclosure, when the outer cylinder is immobilized and the inner cylinder, i.e., the inner body, is rotated, the fluid flows along a rotation direction of the inner cylinder and a force flowing from the inner cylinder toward the outer cylinder is generated by a centrifugal force. In this case, as the rotation speed of the inner cylinder is increased, the fluid becomes unstable and forms a vortex arranged in pair of rings regularly rotating along an axis direction in the opposite directions to each other. The vortex is referred to as the flow of the Taylor fluid. The flow of the Taylor fluid may be formed depending on a rotation speed of the fluid, the radiuses of the inner body and the outer body, a distance between the inner body and the outer body, a viscosity of the fluid, and the like. When a Taylor fluid is formed, a shear fluid force is greatly increased.

In an example embodiment of the present disclosure, a fluid including the first solution containing a graphite-based material and stored in the reaction space 430 of the reactor is rotated to form a Taylor fluid, and a shearing force generated by a Taylor flow is applied to the first solution to exfoliate the graphite-based material. Thus, graphene can be prepared.

Then, in an example embodiment of the present disclosure, a fluid including the second solution containing a metal precursor, a capping agent, and a reducing agent and stored in the reaction space 430 of the reactor is rotated to form a Taylor fluid, and a shearing force generated by a Taylor flow is applied to the second solution. Thus, metal nanoparticles can be prepared.

Further, in an example embodiment of the present disclosure, a fluid including the third solution containing the graphene and the metal nanoparticles and stored in the reaction space 430 of the reactor is rotated to form a Taylor fluid, and a shearing force generated by a Taylor flow is applied to the third solution. Thus, a graphene metal nanoparticle-composite can be prepared.

Figure 3:
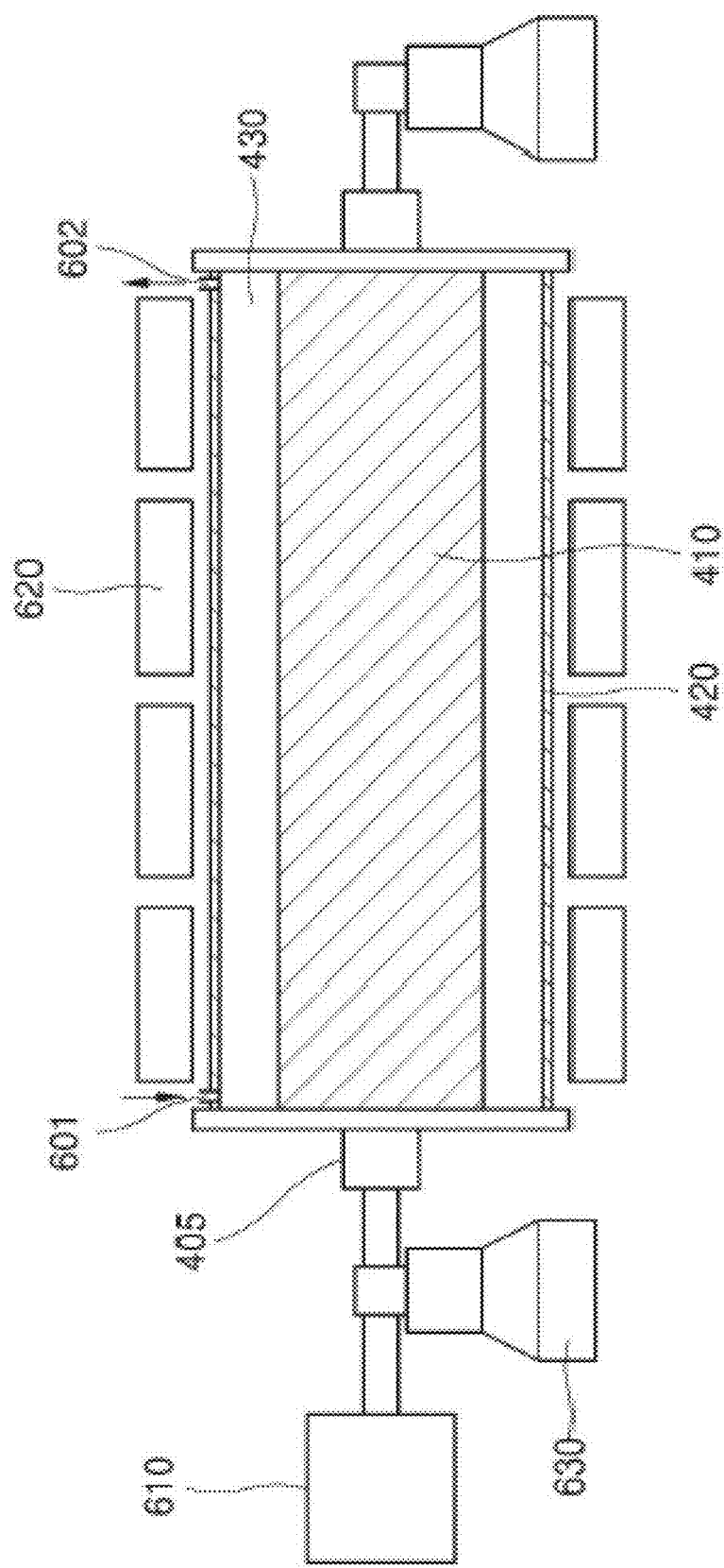
FIG. 3 schematically illustrates a manufacturing apparatus which can be applied to a method of preparing a graphene metal nanoparticle-composite in accordance with the present disclosure.
Figure 4:
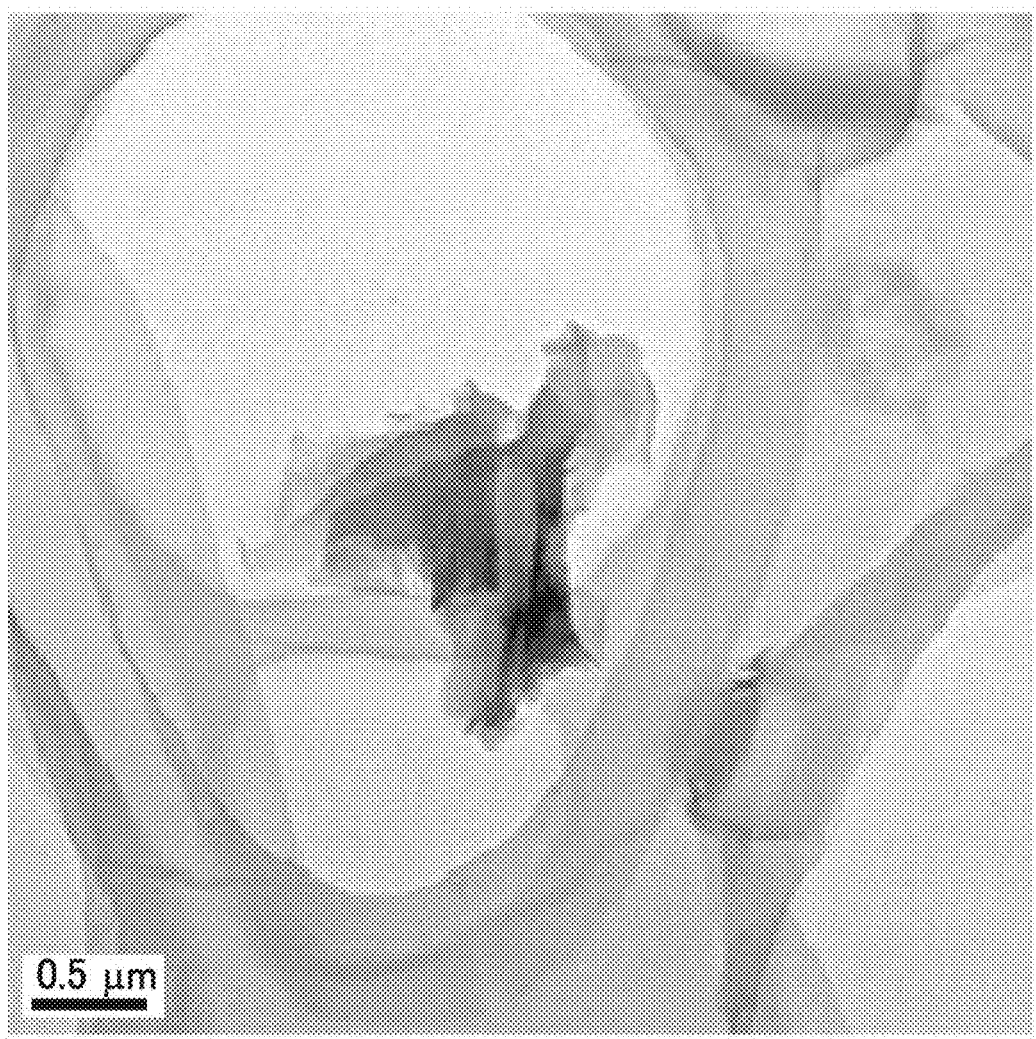
FIG. 4 shows a TEM image of graphene prepared in accordance with an example of the present disclosure.

FIG. 3 schematically illustrates an apparatus of preparing graphene in accordance with an example embodiment of the present disclosure. Referring to FIG. 3, the apparatus of preparing graphene includes the above-described reactor, an inlet opening 601, a discharge opening 602, and a driving unit 610.

In an example embodiment of the present disclosure, the reactor includes the inner body 410 extended in a horizontal direction and the cylindrical outer body 420 surrounding the inner body 410 as being spaced from the inner body 410. The reaction space 430 is formed between the inner body 410 and the cylindrical outer body 420 and stores a fluid therein. Further, the inner body 410 is rotated by the rotation shaft 405, and the cylindrical outer body 420 is immobilized.

In an example embodiment of the present disclosure, the inlet opening 601 is formed on one side of the cylindrical outer body 420. The solution or a fluid including the solution may be injected through the inlet opening 601. The injection may be performed continuously or periodically.

In an example embodiment of the present disclosure, the discharge opening 602 is formed on the other side of the cylindrical outer body 420. Graphene, metal nanoparticles, or a graphene metal nanoparticle-composite prepared using a shearing force generated by a rotating flow of a fluid stored in the reaction space 430 may be discharged through the discharge opening 602.

In an example embodiment of the present disclosure, the discharged material may be separated into a graphene metal nanoparticle-composite, an unreacted graphite-based material, metal nanoparticles, and the like via centrifugation. The unreacted graphite-based material and the metal nanoparticles may be injected again into the reactor through the inlet opening 601.

In an example embodiment of the present disclosure, the driving unit 610 may rotate the inner body 410 and the cylindrical outer body 420 through the rotation shaft 405.

In an example embodiment of the present disclosure, the apparatus of preparing graphene may further include a heater 620 and a support 630. The heater 620 may heat a fluid and thus facilitate a rotating flow of the fluid, and may be configured as surrounding the cylindrical outer body 420.

In an example embodiment of the present disclosure, the support 630 functions to enable the reactor including the rotation shaft 405 to be rotated around the horizontal axis.

Hereinafter, the present disclosure will be explained in more detail with reference to Examples. However, the following Examples are illustrative only for better understanding of the present disclosure but do not limit the present disclosure.

EXAMPLE 1

Preparation of Graphene using Shearing Force

Firstly, 1 g of a graphite-based material (Sigma Aldrich, 282863) was mixed into 200 ml of NMP. Then, the first solution was injected into a shearing force generator without generating bubbles. Then, an inner body of the shearing force generator was rotated at 1,500 rpm for 60 minutes to form a shearing flow. Thus, graphene was exfoliated from the graphite-based material. In order to obtain several layers of graphene, centrifugation was performed (1,000 rpm, 30 min) to the first solution after the reaction was completed, and graphene was obtained from an upper part of the centrifuged solution. A TEM image of graphene prepared as such was as shown in FIG. 1.

Example 2

Preparation of Copper Nanoparticles using Shearing Force

Firstly, 5 ml of Tergitol was added as a dispersing agent to 100 ml of 0.1 M $Cu(NO_3)_2$, and 100 ml of ethylene glycol was added as a solvent and then stirred. Then, 0.2 g of PVP as a capping agent and 9 ml of 30% $NH_4OH$ as a stabilizer were added thereto. Then, a solution containing the metal precursor, the capping agent, and the reducing agent was dropped into the shearing force generator. Then, while rotating the inner body of the shearing force generator at 1,500 rpm for 10 minutes, 50 ml of 0.05M NaBH$_4$ was injected as a reducing agent into a reaction space of the shearing force generator for 1 minute to prepare copper nanoparticles. Then, centrifugation (10,000 rpm, 20 min) and ultrasonication (50% power, 20 min) were performed in sequence.

Figure 5:
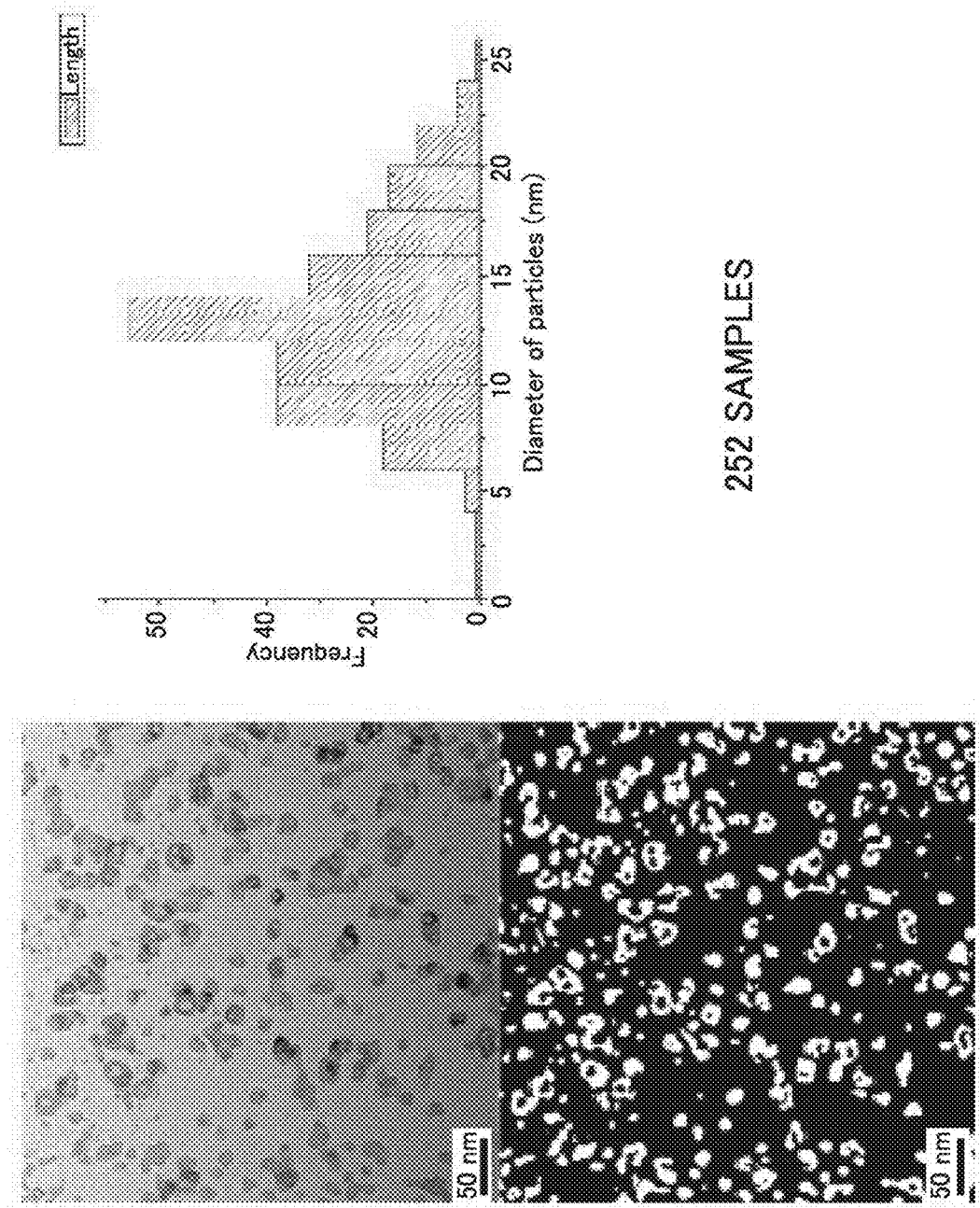
FIG. 5 shows copper nanoparticles prepared in accordance with an example of the present disclosure and a TEM image thereof.

A TEM image of copper nanoparticles prepared as such was as shown in FIG. 5. As shown in FIG. 5, the copper nanoparticles were measured as having an average diameter of 13 nm, and it can be seen that copper nanoparticles having a size of from 10 nm to 15 nm are uniformly distributed.

Example 3

Preparation of Graphene Copper Nanoparticle-Composite using Shearing Force 10 ml of the graphene dispersion solution and 10 ml of the copper nanoparticles with the average diameter of 13 nm obtained in Example 1 and Example 2, respectively, were mixed with stirring. Then, 20 ml of the solution containing graphene and copper nanoparticles was injected into the reaction space of the shearing force generator.

Then, the inner body of the shearing force generator was rotated at 1,500 rpm for 15 minutes to physically combine the copper nanoparticles on the graphene. Thus, graphene copper nanoparticles were prepared.

Figure 6:
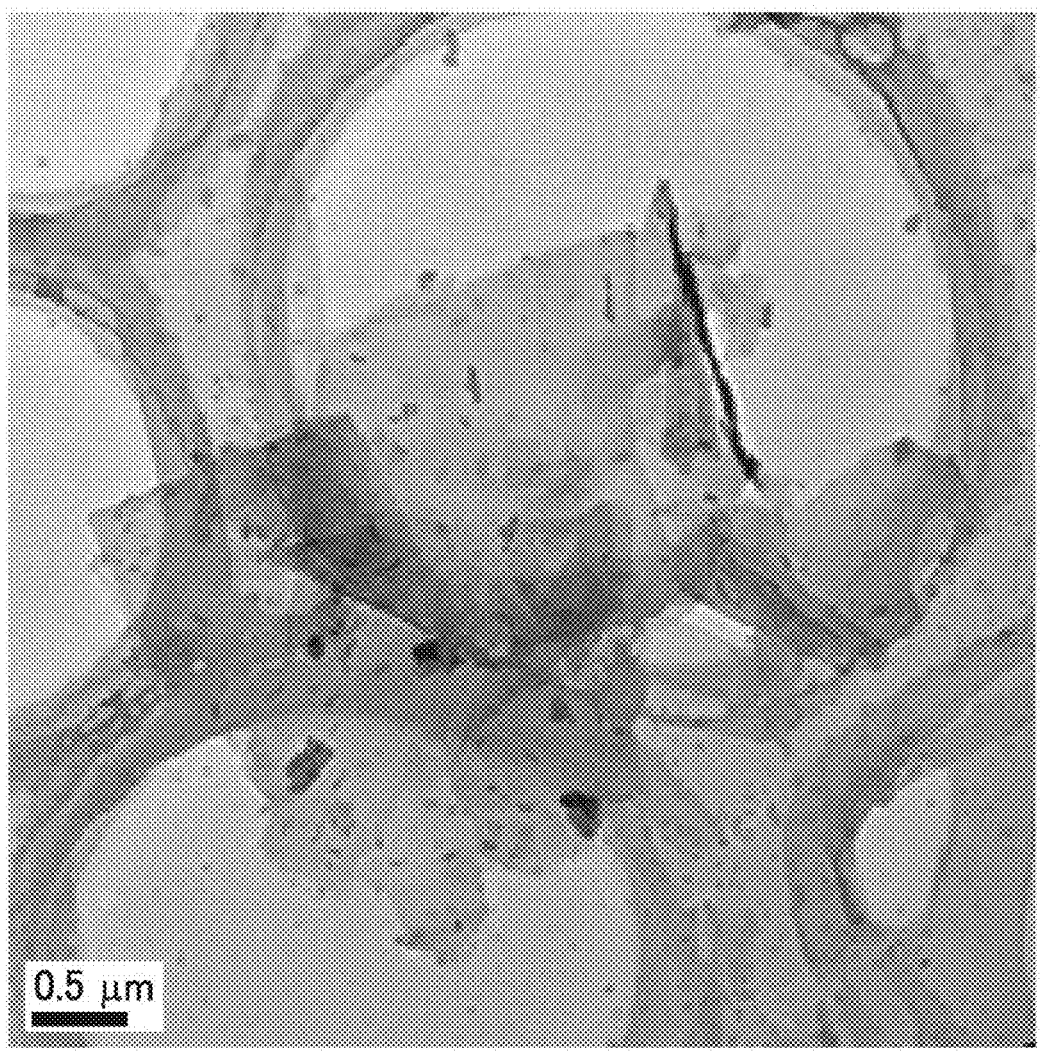
FIG. 6 shows a TEM image of a graphene copper nanoparticle-composite prepared in accordance with an example of the present disclosure.

According to the method of preparing graphene copper nanoparticles according to Example 3, it took 15 minutes to physically combine the copper nanoparticles on the graphene. A TEM image of a graphene copper nanoparticle-composite prepared as such was as shown in FIG. 6.

Comparative Example 1

Preparation of Graphene Copper Nanoparticle-Composite using Magnetic Stirrer

A graphene copper nanoparticle-composite was prepared using the same reactants and the same reaction conditions as those of Example 1 to Example 3 except that a magnetic stirrer (MSH-20D/Daihan Scientific) was used instead of the shearing force generator. When the magnetic stirrer was used, it took 120 minutes only to prepare copper nanoparticles.

Figure 7:
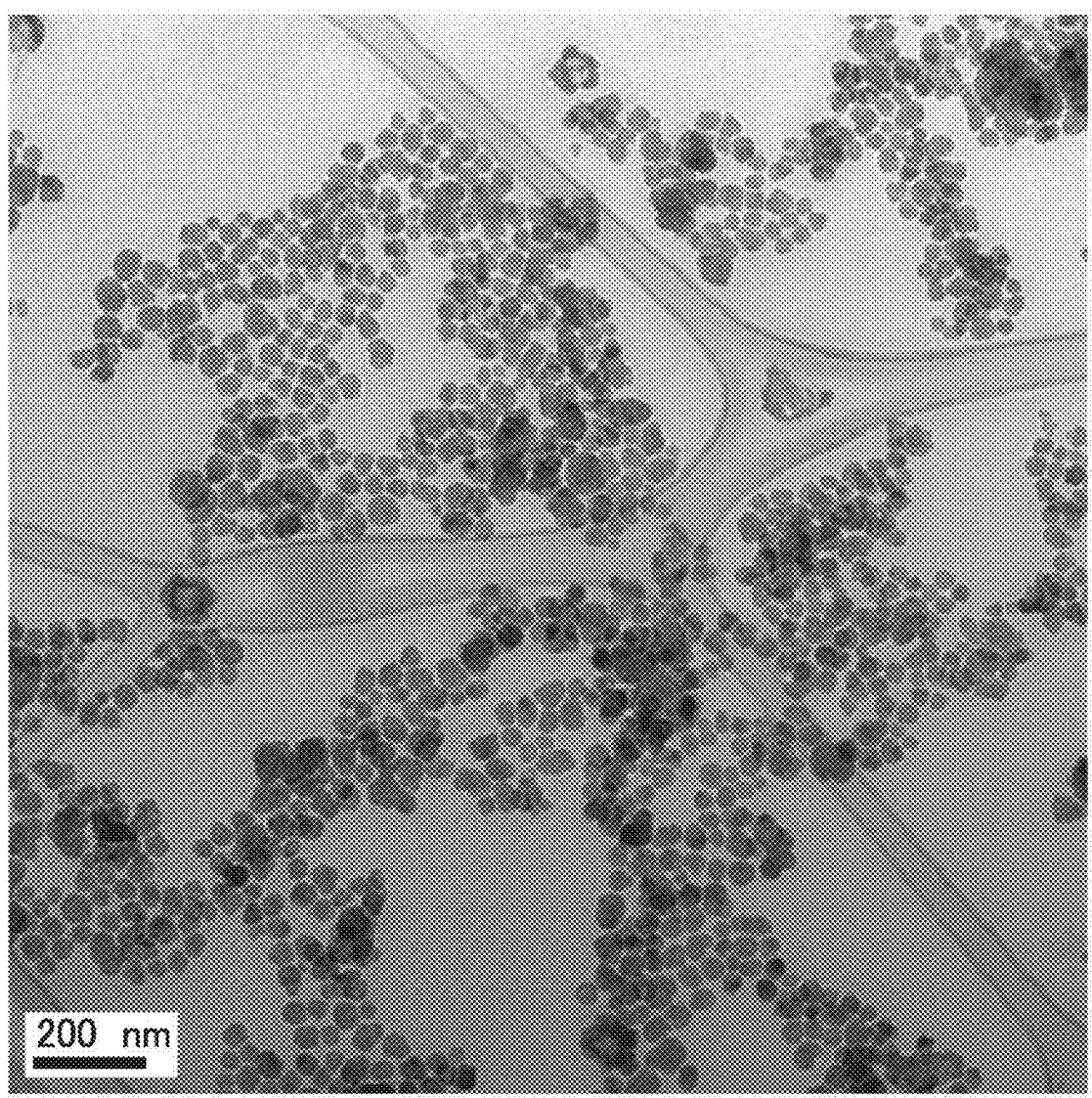
FIG. 7 shows a TEM image of copper nanoparticles prepared in accordance with Comparative Example 1.

A TEM image of copper nanoparticles prepared using the magnetic stirrer was as shown in FIG. 7. As shown in FIG. 7, the copper nanoparticles according to Comparative Example 1 had an average particle size of 50 nm greater than the particle size of the copper nanoparticles according to Example 2. Also, it can be seen that the copper nanoparticles according to Comparative Example 1 are non-uniformly distributed as compared with the copper nanoparticles according to Example 2.

It be seen that according to the method of preparing graphene copper nanoparticles according to Comparative Example 1, it took 120 minutes or more to physically combine the copper nanoparticles on the graphene.

The above description of the present disclosure is provided for the purpose of illustration, and it would be understood by those skilled in the art that various changes and modifications may be made without changing technical conception and essential features of the present disclosure.

Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method of preparing a graphene metal nanoparticle-composite, comprising:
preparing graphene by applying a shearing force to a first solution containing a graphite-based material and thus exfoliating the graphite-based material, the shearing force to the first solution generated by a rotating flow generated by rotating a first fluid including the first solution;
preparing metal nanoparticles by applying a shearing force to a second solution containing a metal precursor, a capping agent, and a reducing agent, the shearing force to the second solution generated by a rotating flow generated by rotating a second fluid including the second solution; and
physically combining the metal nanoparticles on the graphene by applying a shearing force to a third solution containing the graphene and the metal nanoparticles, the metal nanoparticles uniformly distributed on the graphene, the shearing force to the third solution generated by a rotating flow generated by rotating a third fluid including the third solution, and the first fluid, second fluid, and the third fluid being different,
wherein the capping agent is selected from polyvinylpyrrolidone (PVP), polyvinyl alcohol (PVA), polyaniline, polypyrrole, cetyltrimethyl ammonium bromide (CTAB), and combinations thereof,
wherein the rotating of the first fluid, the rotating of the second fluid, and the rotating of third fluid each includes, respectively, the respective fluids being stored in a reaction space of a reactor, the reactor including an inner body extended in a horizontal direction and a cylindrical outer body which surrounds the inner body as being spaced from the inner body and forms the reaction space therein, and the rotating flow of the respective fluid being generated via rotation of the inner body.

2. The method of preparing a graphene metal nanoparticle-composite of claim 1, wherein a rotation speed of the inner body is 1,000 rpm or more for each of the first fluid, the second fluid, and the third fluid.

3. The method of preparing a graphene metal nanoparticle-composite of claim 1, wherein a solvent of the first solution is selected from NMP(N-methyl-2-pyrolidone), DMF(N,N-dimethylformamide), and combinations thereof, a solvent of the second solution is selected from ethylene glycol, propylene glycol, diethylene glycol, triethylene glycol, glycerine, and combinations thereof, and a solvent of the third solution is selected from combinations of the solvent of the first solution and the solvent of the second solution.

4. The method of preparing a graphene metal nanoparticle-composite of claim 1, wherein the metal precursor is selected from metal hydroxide, metal nitrate, metal sulfate, metal acetate, metal phosphate, metal silicate, metal hydrochloride, and combinations thereof.

5. The method of preparing a graphene metal nanoparticle-composite of claim 1, wherein the reducing agent is selected from NaBH4, LiBH4, KBH4, hydrazine, NaOH, and combinations thereof.

6. The method of preparing a graphene metal nanoparticle-composite of claim 1, wherein the metal nanoparticles include those having a diameter of from 10 nm to 25 nm.

* * * * *